United States Patent [19]

Goldstein et al.

[11] Patent Number: 4,647,611

[45] Date of Patent: Mar. 3, 1987

[54] TRAIL ADDITION OF ACRYLAMIDOBUTYRALDEHYDE DIALKYL ACETAL-TYPE MONOMERS DURING THE POLYMERIZATION OF VINYL ACETATE COPOLYMER BINDERS

[75] Inventors: Joel E. Goldstein, Allentown; Chung-Ling Mao, Emmaus, both of Pa.

[73] Assignee: Air Products and Chemicals, Inc., Allentown, Pa.

[21] Appl. No.: 838,973

[22] Filed: Mar. 12, 1986

[51] Int. Cl.⁴ .............................................. C08F 20/58
[52] U.S. Cl. .................................. 524/458; 524/555; 524/813; 526/304
[58] Field of Search ............... 526/304; 524/458, 555, 524/813

[56] References Cited

U.S. PATENT DOCUMENTS

| | | | |
|---|---|---|---|
| 3,380,851 | 4/1968 | Lindemann et al. | 117/140 |
| 3,714,096 | 1/1973 | Biale | 524/555 |
| 3,730,933 | 5/1973 | Stehle et al. | 260/29.6 |
| 4,044,197 | 8/1977 | Wiest | 526/304 |
| 4,272,426 | 6/1981 | Feast | 524/555 |
| 4,446,274 | 5/1984 | Okanaki et al. | 524/812 |
| 4,448,908 | 5/1984 | Pauly et al. | 523/201 |
| 4,449,978 | 5/1984 | Iacoviello | 604/372 |
| 4,497,917 | 2/1985 | Upson et al. | 523/201 |
| 4,510,274 | 4/1985 | Okazaki | 526/304 |

*Primary Examiner*—Paul R. Michl

*Attorney, Agent, or Firm*—Michael Leach; James C. Simmons; E. Eugene Innis

[57] ABSTRACT

In a process for preparing a nonwoven binder emulsion containing a crosslinkable vinyl acetate or vinyl acetate/ethylene copolymer prepared by polymerizing in an aqueous dispersion vinyl acetate or vinyl acetate and ethylene with a crosslinkable comonomer of formula I $$R-NH-(CH_2)_n-CH(OR^1)_2 \qquad (I)$$

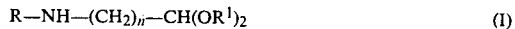

wherein R is a $C_3$-$C_{10}$ olefinically unsaturated radical having functionality which renders the nitrogen atom electron deficient, the olefinic unsaturation functionality being polymerizable, $R^1$ is hydrogen or a $C_1$-$C_4$ alkyl group and n is 3 or 4, the method for improving the wet tensiles of such copolymer which comprises (1) polymerizing vinyl acetate in an aqueous dispersion reaction medium, optionally under an ethylene pressure, (2) commencing the addition of 0.5 to 15 wt % of a crosslinkable comonomer of formula I to the reaction mixture when about 50-80% of the total vinyl acetate in the polymerization recipe has been polymerized, and (3) completing addition of the crosslinkable comonomer after the completion of the addition of the vinyl acetate to the reaction mixture and substantially with the finishing of vinyl acetate polymerization, i.e. when the free vinyl acetate content of the reaction medium is from 0.5 to 4 wt %.

25 Claims, No Drawings

TRAIL ADDITION OF ACRYLAMIDOBUTYRALDEHYDE DIALKYL ACETAL-TYPE MONOMERS DURING THE POLYMERIZATION OF VINYL ACETATE COPOLYMER BINDERS

TECHNICAL FIELD

This invention relates to binder compositions for nonwoven products comprising copolymerized vinyl acetate, optionally ethylene, and a crosslinking monomer.

BACKGROUND OF THE INVENTION

Nonwoven products comprise loosely assembled webs or masses of fibers bound together with an adhesive binder. Adequately bonded nonwoven fabrics have advantages over woven fabrics for a large variety of uses. It is known to form bonded nonwoven fabrics by impregnating, printing or otherwise depositing an adhesive bonding composition on a base web of fibers. These fibers may be of cellulosic or polymeric materials such as wood pulp, polyesters, polyamides, polyacrylates and the like. The base web of nonwoven fibers, to which the binder is applied, can be produced by carding, garnetting, air laying, wet laying, paper making procedures, or other known operations.

The polymeric binder must imbue the bonded nonwoven product with acceptable dry and wet tensile strengths and solvent resistance for the intended application.

One of the more successful copolymer binder compositions for nonwoven products comprises a vinyl acetate/ethylene/N-methylolacrylamide copolymer. (See U.S. Pat. No. 3,380,851). However, such N-methylolacrylamide (NMA) containing copolymers liberate formaldehyde during cure and subsequent use of the nonwoven.

U.S. Pat. No. 4,449,978 discloses nonwoven products bonded with a binder comprising a polymer of vinyl acetate/ethylene/N-methylolacrylamide/acrylamide. These nonwoven products have a low residual free formaldehyde content.

Other comonomers which have been utilized in preparing self-crosslinking polymer binders include, in addition to N-methylolacrylamide (NMA), N-isobutoxymethyl acrylamide (IBMA).

U.S. Pat. No. 3,730,933 discloses stable vinyl acetate/N-methylolacrylamide copolymer emulsions containing fully-hydrolyzed polyvinyl alcohol prepared by dispersing the polyvinyl alcohol in water substantially in the absence of the monomeric reactants and effecting copolymerization while adding both monomers gradually and simultaneously to the polyvinyl alcohol dispersion, the vinyl acetate and the NMA being added in substantially constant ratio and at a rate substantially not exceeding the rate of their copolymerization.

U.S. Pat. No. 4,446,274 discloses a vinyl acetate-ethylene copolymer emulsion, the copolymer also comprising an acid monomer and a N-alkoxymethyl acrylamide. The vinyl acetate-ethylene copolymer emulsion may be obtained by a two-step process comprising the first step of polymerizing 20–80% of vinyl acetate monomer under an ethylene atmosphere until the degree of polymerized monomers reaches 5–50% of the total monomers, and the second step of adding a mixture containing the remaining portion of vinyl acetate monomer, an acid monomer and a N-alkoxymethyl acrylamide monomer followed by completion of polymerization under the ethylene atmosphere.

U.S. Pat. No. 4,448,908 discloses a latex, the particles of which comprise a polymer core and a shell thereover, the shell comprising a water insoluble monomer of the formula

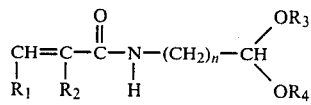

U.S. Pat. No. 4,497,917 discloses latex compositions comprising core-shell polymer particles.

Application Ser. No. 714,661 filed 21 March 1985 discloses binder polymers of formaldehyde-free crosslinking monomers. Illustrative of such formaldehyde-free crosslinking monomers is acrylamidobutyraldehyde diethyl acetal (ABDA). The problem was how to make the most efficient use of the new functional monomers such as ABDA in vinyl acetate emulsion polymers. Continuous addition of these monomers throughout the reaction as a substitute for NMA on equivalent basis provided polymers with encouraging properties but they still fell short of tensile strengths of the NMA-containing copolymer. The ABDA monomer being expensive would not provide an economical product if additional equivalents of ABDA were added, so a more efficient use of the ABDA monomer already present had to be developed.

Conventional techniques developed for preparing polymers containing NMA and IBMA-type monomers do not promote efficient use of the ABDA-type monomers.

SUMMARY OF THE INVENTION

The present invention provides a method for the preparation of aqueous colloidal dispersions (or emulsions) of vinyl acetate copolymers which are useful as nonwoven binders having improved wet tensile strength. The nonwoven binder emulsion contains a crosslinkable vinyl acetate copolymer prepared by polymerizing as an aqueous dispersion vinyl acetate and 0.5 to 15 wt %, based on vinyl acetate, of a crosslinkable comonomer of formula I $$R-NH-(CH_2)_n-CH(OR^1)_2 \qquad I$$

where R is a $C_3$–$C_{10}$ olefinically unsaturated organic radical having functionality which renders the nitrogen atom electron deficient, the olefinic unsaturation being polymerizable, $R^1$ is hydrogen or a $C_1$–$C_4$ alkyl group and n is 3 or 4.

The preferred monomer of formula I dialkyl acetals is acrylamidobutyraldehyde dialkyl acetal (ABDA).

When the term "ABDA-type" monomers is used, it is to be understood that monomers of formula I are contemplated.

The method for performing the polymerization reaction according to the invention comprises:

(1) polymerizing vinyl acetate in an aqueous dispersion reaction mixture, (2) adding the crosslinkable comonomer of formula I to the reaction mixture when about 50–80% of the total vinyl acetate in the polymerization recipe has been polymerized, and (3) completing addition of the crosslinkable comonomer substantially with the finish of vinyl acetate polymerization, i.e. when the free vinyl acetate content of the reaction mixture is from 0.5 to 4%.

Addition of the ABDA-type monomer toward the end of the polymerization after completion of vinyl acetate addition, rather than throughout the reaction, increases the efficiency of the ABDA-type monomer. The ABDA-type monomer copolymerizes with the vinyl acetate but tends to remain close to the growing particle's surface due to its solubility parameters. when added toward the end of the polymerization, the surface of the growing particle is the surface of the finished polymer.

Such "trail" addition of ABDA-type monomers beyond the completion of vinyl acetate addition to the polymerization reaction results in a polymer with better performance properties, i.e. wet strength and solvent resistance, as a nonwoven binder than such polymers prepared by conventional methods.

DETAILED DESCRIPTION OF THE INVENTION

The present invention provides a method for preparing a crosslinkable vinyl acetate emulsion copolymer of 35–65 wt % solids possessing improved properties as a binder for nonwoven products. The copolymer contains vinyl acetate as the monomer primarily composing the backbone and optionally may contain ethylene in an amount from 3 to 30 wt %. It is preferred that the vinyl acetate copolymer contain about 8 to 20 wt % ethylene to provide a nonwoven product possessing suitable softness and flexibility.

Contemplated as the functional, or operative, equivalent of vinyl acetate in the copolymers prepared according to the invention are other vinyl esters of $C_1$–$C_{12}$ alkanoic acids. such as vinyl formate, vinyl propionate, vinyl butyrate and the like.

The crosslinkable monomer which enables the vinyl acetate copolymer to function as a nonwoven binder is a comonomer of formula I $$R-NH-(CH_2)_n-CH(OR^1)_2 \quad \text{I}$$

wherein R is a $C_3$–$C_{10}$, preferably $C_3$–$C_5$, olefinically unsaturated organic radical having functionality which renders the nitrogen atom electron deficient, the olefinic unsaturation functionality being polymerizable, $R^1$ is hydrogen, a $C_1$–$C_4$ alkyl group, preferably methyl or ethyl, and n is 3 or 4, preferably 3.

Preferably, R represents an alpha,beta-unsaturated $C_3$–$C_{10}$ alkenoyl group such as acryloyl, methacryloyl, crotonoyl, isocrotonoyl, cinnamoyl, and the like, especially a (meth)acryloyl.

Contemplated as the functional, or operative, equivalent of the formula I dialkyl acetals are the cyclic hemiamidals of formula II.

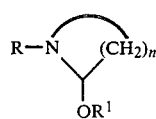

The formula I dialkyl acetals under acidic conditions cyclize to the hemiamidals of formula II.

The vinyl acetate copolymer comprises .baout 0.5 to 15 wt % of the crosslinkable comonomer, especially about 2 to 6 wt %, based on vinyl acetate monomer.

Representative of the dialkyl acetal comonomers of formula I are the following:
acrylamidobutyraldehyde diethyl acetal (ABDA)
acrylamidobutyraldehyde dimethyl acetal (ABDA-Me)
acrylamidobutyraldehyde methylethyl acetal
acrylamidopentanal diethyl acetal (APDA)
crotonamidobutyraldehyde diethyl acetal (CBDA)
methacrylamidobutyraldehyde diisopropyl acetal
diethoxybutylmaleamic acid (DBMA)
cinnamamidobutyraldehyde diethyl acetal (DEBC)
O-allyl-N-(diethoxybutyl)carbamate (ADBC)
O-vinyl-N-(diethoxybutyl)carbamate (DBVC)
N-(diethoxybutyl)-N'-(meth)acryloxyethyl urea (DEBMU)
N-(diethoxyethyl)-N'-(meth)acryloxyethyl urea (DEEMU) or thiourea Illustrative of the cyclic hemiamidals of formula II are the following compounds:
N-acryloyl-2-ethoxypyrrolidine (AEP)
N-acryloyl-2-methoxypyrrolidine (AMP)
N-(meth)acryloyl-2-hydroxypyrrolidine (AHP)
N-(allyloxycarbonyl)-2-alkoxypiperidine
N-vinyloxycarbonyl-2-alkoxypiperidine
1-allyl-6-ethoxy-(4-methyl)hexahydropyrimidin-2-one (AEMHP)
N-cinnamoyl-2-alkoxypyrrolidine Methods for the preparation of crosslinkable comonomers of formula I and formula II as well as other examples of such comonomers are disclosed in copending patent application Ser. No. 714,661, filed Mar. 21, 1985 which is incorporated by reference.

Other suitable copolymerizable monomers that may be included in amounts up to about 20 wt % include $C_3$–$C_{10}$ alkenoic and alkenedioic acids such as acrylic, methacrylic, crotonic, isocrotonic, maleic. fumaric and itaconic acids and their esters (mono- and diesters) with $C_1$–$C_{18}$ alkanols, such as methanol, ethanol, butanol and 2-ethylhexyl alcohol, especially acrylate esters such as butyl acrylate; vinyl halides such as vinyl chloride; vinylidene halides such as vinylidene chloride; other alkenes; styrene; vinyl ethers, such as methyl vinyl ether and isobutyl vinyl ether; and nitrogen containing monoolefinically unsaturated monomers, particularly nitriles, amides, N-methylol amides, lower alkanoic acid esters of N-methylol amides, lower alkyl ethers of N-methylol amides and allyl carbamates, such as acrylonitrile, acrylamide, methacrylamide, N-methylolacrylamide, N-methylolmethacrylamide, N-methylol allyl carbamate, N-methylol lower alkyl ethers and N-methylol lower alkanoic acid esters of N-methylolacrylamide, N-methylolmethacrylamide and N-methylol allyl carbamate, and vinyl amides such as N-vinyl pyrrolidone, N-vinyl acetamide and N-vinyl formamide.

The method for preparing the copolymers according to the invention comprises
(1) polymerizing vinyl acetate in an aqueous dispersion reaction medium, optionally under a pressurized ethylene atmosphere,
(2) commencing the addition of the crosslinkable comonomer to medium when about 50–80% of the total vinyl acetate in polymerization recipe has been polymerized. and
(3) completing addition of the crosslinkable comonomer after the completion of the addition of the vinyl acetate to the reaction medium and substantially with the finishing of vinyl acetate polymerization; that is to say, complete the addition of the crosslinkable comonomer when the free vinyl acetate content of the reaction mixture is from 0.5 to 4 wt %, preferably from 1 to 2 wt %.

Whether the vinyl acetate is all added upfront, or all or a part is added during the polymerization reaction, the last portion of crosslinkable comonomer will be added after completing the total vinyl acetate addition.

It is preferred that about 65-75% of the vinyl acetate for polymerization be converted before the crosslinkable comonomer is first added to the polymerization reaction medium. This addition of vinyl acetate monomer can be accomplished by adding it all up front, partially up front and the rest by incremental addition, or all of it can be incrementally added to the reaction mixture provided that at least 50-80% of it is polymerized before addition of any crosslinkable comonomer.

The incremental addition of vinyl acetate, crosslinkable comonomer and/or other comonomer can be continuous or intermittent, but preferably uniform, and is often referred to as "delay" addition.

The crosslinkable comonomer should be substantially completely added to the polymerization reaction mixture when the conversion of the vinyl acetate monomer has essentially finished, that is to say the delay addition of the crosslinkable comonomer should finish when the free vinyl acetate monomer content of the polymerization reaction mixture is from about 0.5 to 4 wt %.

Where the vinyl acetate copolymer binder is also to contain ethylene, the polymerization vessel is charged with ethylene to a suitable pressure to provide a copolymer with the desired ethylene content as is well known in the vinyl acetate-ethylene copolymerization art.

Catalytically effective amounts of various free-radical forming materials can be used in carrying out the polymerization of the monomers, such as peroxide compounds like peracetic acid, benzoyl peroxide, and persulfate salts and azo compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythorbic acid and other reducing sugars. The oxidizing agents including hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; t-butyl hydroperoxide and erythorbic acid; hydrogen peroxide, ammonium persulfate, potassium persulfate or t-butyl hydroperoxide with sodium metabisulfite, sodium bisulfite, ferrous sulfate, zinc formaldehyde sulfoxylate, sodium formaldehyde sulfoxylate or sodium acetone bisulfite. Other free radical forming systems that are well known in the art can also be used to polymerize the monomers.

The oxidizing agent is generally employed in an amount of 0.01-1%, preferably 0.05 to 0.5% based on the weight of the monomers introduced into the polymerization system. The reducing agent is ordinarily added in the necessary equivalent amount.

Many of the well known emulsifying agents can be used, such emulsifying agents include ionic and non-ionic surfactants such as sodium lauryl sulfate, sodium sulfosuccinate esters and amides, sulfonated alkyl benzenes, alkylphenoxy polyethoxy ethanols and other polyoxyethylene condensates.

The concentration range of the total amount of emulsifying agents useful is from less than 0.5-5% based on the aqueous phase of the emulsion regardless of a solids content.

In addition to or in place of the surfactants, protective colloids such as polyvinyl alcohol and celluloses like hydroxyethyl cellulose, methyl cellulose, hydroxypropylmethyl cellulose and the like can be used as the emulsifying, or stabilizing, agent.

In general, the emulsion product is prepared by continually adding vinyl acetate to a reaction vessel charged with deionized water, surfactants buffer and reducing agent. The oxidizing agent is added either as an aqueous solution, as is additional reducing agent, or dissolved in the vinyl acetate. An ethylene pressure may optionally be imposed to afford a vinyl acetate/ethylene copolymer. When 67% or more of the vinyl acetate has been introduced into the reaction vessel, the addition of the crosslinkable comonomer commences and continues beyond the completion of the vinyl acetate delay.

It is preferred to use about 6 wt % ABDA. based on vinyl acetate, with the ABDA addition beginning when 70% of the vinyl acetate has been introduced into the reactor and continuing for one hour past the completion of the vinyl acetate delay. The ethylene pressure is maintained at 450 psi until the 3 hour mark when it is allowed to decay. The temperature of the reaction is about 50° C. and the pH about 4.5.

When prepared in this manner, the polymers containing ABDA can exhibit wet tensiles as high as 7.1 and perchloro tensiles of 9.6 when cured with ammonium chloride at pH 4.0.

Using the trail procedure of the invention, the level of ABDA may be reduced from 6% to 2% without substantial loss of properties provided the ethylene incorporation is about the same. At equivalent Tg and hand, polymers with 2% ABDA approach the wet, dry and perchloro tensiles of those with 6% ABDA. Improvements in performance have been observed when the ABDA delay, after the vinyl acetate addition is complete, is extended to about 90 minutes and also when up to 75% of the ABDA is added after the vinyl acetate addition is finished.

The preferred emulsions prepared in this manner have a pH of 4.2-4.6, free monomer less than 1.5%, solids of about 40-55% and Brookfield viscosities ranging from 80 cps to 2600 cps. The Tg's of the copolymers are between −6° and 10° C.

It has been found that if too much ethylene is incorporated, either by increasing the pressure or by running monomer starved, the properties of the crosslinkable vinyl acetate copolymer erode. The reduction in properties is believed due to the reduction in molecular weight. An increase in ethylene incorporation often results in a lower molecular weight.

In the conventional "continuous" procedure for preparing crosslinkable vinyl acetate nonwoven binders, the crosslinkable monomer is added continuously throughout the polymerization such that the delay begins and ends more or less as the vinyl acetate feed begins and ends. Due to the higher reactivity of the crosslinkable monomer relative to that of vinyl acetate and ethylene, conventional polymer particles contain large amounts of the crosslinkable monomer at their core and have a shell of nearly pure vinyl acetate or vinyl acetate/ethylene. Since crosslinking the particles to achieve wet strength requires that there be reactive sites available, two of the reactive moieties must come in contact. If there are few of these at the surface of the particles, there will be less chance for this crosslinking to occur and relatively few crosslinks will result upon cure.

Addition of the crosslinkable monomer can start after 70% of the vinyl acetate has been introduced into the polymerization reactor and can be completed at the same time as the vinyl acetate feed. This "end" method precludes squandering the more expensive crosslinking monomer at the core of the polymer particle which is now predominantly either pure polyvinyl acetate or a copolymer of vinyl acetate and ethylene.

Surrounding the core will be a layer rich in crosslinking functionality, but due to the different reactivities, this layer may still be covered by a coating of largely unfunctionalized polymer. Copolymer binders made by this "end" approach would have more reactive groups close to the surface of the particles than conventional polymers so more crosslinks may form, but this coating of unfunctionalized polymer would preclude efficient use of the crosslinkable comonomer.

Using the "trail" procedure according to the invention, superior properties are obtained. When the addition of the crosslinkable monomer trails that of the vinyl acetate, there is less of a coating of unfunctionalized polymer covering the particles. As before, little if any specialty monomer is squandered in the core, but rather it is concentrated at the surface. Since it is being added to the reaction medium after the vinyl acetate has been introduced, there will be crosslinkable monomer available to copolymerize with the slow reacting residual vinyl acetate. Upon completion of the crosslinkable monomer delay, most of the vinyl acetate has been consumed, resulting in a thinner or a less complete shell of pure polyvinyl acetate or vinyl acetate/ethylene copolymer coating the particle.

The present inventive "trail" procedure does not work with all crosslinkable monomers. For example, polymers prepared by the "end" and "trail" methods described above where N-isobutoxymethylacrylamide (IMBA) is the crosslinkable monomer. do not perform any better than conventional ("continuous") delay polymers containing the same monomer ratios. These materials perform poorly compared to polymers prepared with ABDA. Polymers prepared with NMA using this "trail" technique are inferior to nonwoven binders containing NMA prepared in the conventional manner.

The reason the present invention works for ABDA and its derivatives may be related to its solubility and partition parameters. Since these polymers are water soluble, they should absorb on the surface of the polymer particles and be copolymerized at the outside of the growing particle. If the ABDA is added when there is little vinyl acetate left to react, the outside of the growing particle becomes the shell of the finished particle. A particle results which has a high density functionality at or near the surface. If the monomer is not water soluble, like IBMA, it would diffuse away from the aqueous phase toward the core of the particle and become copolymerized there. This yields a polymer rich in the functionality distant from the surface, providing few sites for interaction between particles. When the monomer is so water soluble that it prefers the aqueous to the organic phase, most of it will homopolymerize in the water phase rather than copolymerize with vinyl acetate, especially if relativel.y little vinyl acetate is available, this will result in a latex comprised of two types of polymers; one rich in crosslinkable comonomer and the other poor in the crosslinkable comonomer which is randomly dispersed throughout its volume.

The crosslinkable vinyl acetate copolymers derived by the procedure of the present invention are useful as binder compositions in the preparation of nonwoven products, or fabrics, by a variety of methods known in the art which, in general, involve the impregnation of a loosely assembled mass of fibers with the copolymer binder emulsion, followed by moderate heating to dry the mass.

This moderate heating also usually serves to cure the binder by forming a crosslinked interpolymer. Before the binder is applied it is, of course, mixed with a suitable catalyst for the crosslinking monomer. For example, an acid catalyst such as mineral acids, e.g. hydrogen chloride, or organic acids, e.g. p-toluenesulfonic acid, or acid salts such as ammonium chloride, are suitably used as is known in the art. The amount of catalyst is generally about 0.5 to 2% of the total resin. It has been discovered with respect to the binder polymers prepared using the monomers of the invention that simple amine acid salts, such as ammonium chloride, ammonium acetate and methyl ammonium chloride are surprisingly the preferred catalysts for crosslinking.

The starting fiber layer or mass can be formed by any one of the conventional techniques for depositing or arranging fibers in a web or layer. These techniques include carding, garnetting, air-laying and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting and supporting one another to form an open, porous structure.

When reference is made to "cellulose" fibers, those fibers containing predominantly $C_6H_{10}O_5$ groupings are meant. Thus, examples of the fibers to be used in the starting layer are the natural cellulose fibers such as wood pulp, cotton and hemp and the synthetic cellulose fibers such as rayon, and regenerated cellulose. Often the fibrous starting layer contains at least 50% cellulose fibers whether they be natural or synthetic, or a combination thereof. Often the fibers in the starting layer may comprise the natural fibers such as wool, jute; artificial fibers such as cellulose acetate; synthetic fibers such as polyvinyl alcohol, polyamides, nylon, polyester, acrylics, polyolefins, i.e. polyethylene. polyvinyl chloride. polyurethane. and the like, alone or in combination with one another.

The fibrous starting layer is subjected to at least one of the several types of bonding operations to anchor the individual fibers together to form a self-sustaining web. Some of the better known methods of bonding are overall impregnation, or printing the web with intermittent or continuous straight or wavy lines or areas of binder extending generally transversely or diagonally across the web and additionally, if desired, along the web.

The amount of binder, calculated on a dry basis, applied to the fibrous starting web is that amount which is at least sufficient to bind the fibers together to form a self-sustaining web and suitably ranges from about 3 to about 100% or more by weight of the starting web, preferably from about 10 to about 50 wt % of the starting web. The impregnated web is then dried and cured. Thus the fabric is suitably dried by passing it through an air oven or the like and then through a curing oven. Typical laboratory conditions to achieve optimal crosslinking are sufficient time and temperature such as drying at 150°-200° F. (66°-93° C.) for 4 to 6 minutes, followed by curing at 300°-310° F. (149°-154° C.) for 3 to 5 minutes or more. However, other time-temperature relationships can be employed as is well known in the art, shorter times at higher temperatures or longer times at lower temperatures being used.

Improving the wet tensile property in a nonwovens application is not the only benefit obtained by the inventive procedure. It has been observed with conventional polymers that with decreasing levels of crosslinkable monomer, though wet and dry tensiles are nearly equivalent, the perchloro tensiles noticeably erode. With the present procedure not only are the wet and dry tensiles equivalent to those at higher levels of ABDA incorporation, but the perchloro tensile is also maintained.

The crosslinkable vinyl acetate copolymers prepared according to the invention may also have use in (a) adhesives for glass, wood, paper, ceramics, melal and other substrates; (b) paintings and coatings; (c) medical/surgical drapes; and (d) sizing material.

Synthesis of Acrylamidobutyraldehyde Diethyl Acetal (ABDA).

4-A,inobuityraldehyde diethyl acetal (AmBDA, 75g, 1.09 mol, Aldrich Chemical) was combined with a two phase mixture of 955 mL of $CH_2Cl_2$ and 160 mL of 14 N NaOH in a 3 neck flask equipped with a thermometer and an efficient mechanical stirrer. This was cooled to 15° C. with an ice bath. Acryloyl chloride (98.3 g, 1.09 mol, Aldrich) was added via an additional funnel at a rate slow enough to maintain the reaction temperature below 30° C. Reaction monitoring by capillary glpc revealed essentially complete AmBDA consumption when the acryloyl chloride addition was complete. Agitation was continued for 1 h. The layers were separated (water may be added to dissolve precipitated salt and improve phase separation) and the organic phase was washed with saturated brine. The brine was combined with the aqueous layer and back extracted with $CH_2Cl_2$. The combined organic layers were neutralized with saturated aqueous $NaH_2PO_4$, dried over anhydrous $MgCl_2$ and concentrated on a rotary evaporator at 40° C. to give 99% pure ABDA (by glpc) in 87% yield. The product an be freed of any high molecular weight by-products by kugelrohr distillation (120°-125° C. at 0.2 torr), but this produces significant yield losses and partial isomerization to N-acryloyl-5-ethoxy pyrrolidine (AEP) and related products. The pot temperature should not exceed 60° C. during these operations. The yield loses are minimized by adding a basic reagent, such as $Na_2CO_3$, and a radical inhibitor, such as methylene blue, to the distillation vessel.

EXAMPLE 1

PVOH/VAc/ABDA  19/76/5  Continuous

A 2 l reactor was charged with 300 g of a 20% aqueous solution of Vinol 205 polyvinyl alcohol, 210 g deionized water and 15 g vinyl acetate and purged for 45 minutes with nitrogen. The reactor was heated to 55° C. and the reaction initiated by adding two solutions (one a 2.5% aqueous solution of hydrogen peroxide and the other a 2.5% aqueous solution of ascorbic acid) at a rate of 0.34 ml/min. Upon initiation, a solution of 15g ABDA in 225 g vinyl acetate was added at a rate of 2.5 ml/min., and the reducing agent and oxidizing agent solutions were cut back to 5.5 ml/hr. (If the reaction were to get too hot, the jacket would have been cooled to maintain a reaction temperature of 56° C. and a free monomer of 1.3%.) The reaction was complete after 2.25 hours.

EXAMPLE 2

PVDH/VAc/ABDA  19/75/5  End

A 2 l reactor was charged with 300 g of a 20% aqueous solution of Vinol 205 polyvinyl alcohol, 210 g deionized water and 225 g vinyl acetate and purged for 45 minutes with nitrogen. The reactor was heated to 55° C. and the reaction initiated by adding two solutions (one a 2.5% aqueous solution of hydrogen peroxide and the other a 2.5% aqueous solution of ascorbic acid) at a rate of 0.34 ml/min. Upon initiation, the reductant and oxidant solutions were cut back to 5.5 ml/hr. (If the reaction were to get too hot, the jacket would have been cooled to maintain 56° C.) When the free monomer reached 2.0%. a solution of 15 g ABDA and 15 g vinyl acetate was added at a rate of 2.3 ml/min. The reaction was complete after 1.25 hours.

EXAMPLE 3

PVOH/VAc/ABDA  19/76/5  Trail

A 2 l reactor was charged, purged and heated and the reaction initiated as in Example 1. Upon initiation, the reductant and oxidant solutions were slowed to 5.5 ml/hr. and 30g vinyl acetate was added at 2 15 ml/min. When the vinyl acetate had been added, a solution of 2.65g ABDA in 195g vinyl acetate was added at 2.15 ml/min., and when this had been added 11.8g of a 20% aqueous solution of ABDA was added at the same rate. (If the reaction were to get too hot, the jacket would have been cooled to maintain a reaction temperature of 55° C. and a free monomer of 0.8%.) The reaction was complete in 1.5 hours.

EXAMPLE 4

PVOH/VAc/Et/ABDA  9/86/5  Continuous

A 1 gallon reactor was charged with 1520 g of a 10% aqueous solution of Vinol 205 polyvinyl alcohol, 283 g vinyl acetate, 10 g of a 0.2% aqueous solution of ferrous sulfate and 10 g of a 2.5% aqueous solution of erythorbic acid and purged for 30 minutes with ethylene to 900 lbs. (no make-up) and initiated by adding two solutions (one a 2.5% aqueous solution of erythorbic acid and the other a 2.5% aqueous solution of hydrogen peroxide) at 3.0 ml/min. Upon initiation, the rates were slowed to 0.7 ml/min., 1130 g vinyl acetate added at 3.8 ml/min. and 394 g of a 20% aqueous solution of ABDA (with 2.0 g of Igepal CO 887 surfactant added) added to 1.3 ml/min. The temperature was maintained at 53° C. and the free monomer at 4%. The monomers were added in 4.5 hours, but the oxidant and reductant solutions were added for an additional 30 minutes. The reaction was cooled, degassed and treated with 4.6 g of a 50% aqueous solution of Colloid 585 defoamer.

EXAMPLE 5

PVOH/VAc/Et/ABDA  9/86/5  Trail

A 1 gallon reactor was charged with 1,413.6 l g of a 10% aqueous solution of Vinol 205 polyvinyl alcohol, 263.2 g vinyl acetate, 10 g of a 0.2% aqueous solution of ferrous sulfate and 10 g of a 2.5% aqueous solution of erythorbic acid and purged for 30 minutes with nitrogen. The reactor was heated to 55° C., agitated at 900RPM, pressurized with ethylene to 900 lbs. (no make-up) and initiated by adding two solutions (one a 2.5% aqueous solution of erythorbic and the other a 2.5% aqueous solution of hydrogen peroxide) at 3.0 ml/min. Upon initiation, the rates were slowed to 0.70 ml/min. and 1050.9 g vinyl acetate added at 3.8 ml/min. The temperature was maintained at 53° C. and the free monomer at 4.0%. After 4.25 hours, 366.4 g of a 20% aqueous solution of ABDA was added at 4.1 ml/min. The vinyl acetate delay was complete after five hours and the ABDA after 5.5 hours. The activator and catalyst solutions were added until the six hour mark whereupon the reaction is cooled, degassed and treated with 4.6 g of a 50% aqueous solution of Colloid 585 defoamer.

EXAMPLE 6

VAc/Et/ABDA (3%)   Continuous

A 1 gallon reactor was charged with 42.8 g vinyl acetate. 14.3 g Igepal CO 887 surfactant, 10.0 g Igepal CO 630 surfactant, 10.0 g Pluronic F-68 surfactant, 10.0 g Pluronic L-64 surfactant, 857 g of a 2% aqueous solution of NATROSOL 250GR hydroxyethyl cellulose, 47.0 g deionized water, 4.1 g sodium acetate. 0.05 g ferrous ammonium sulfate, 3.28 g acetic acid, and purged 40 minutes with nitrogen The reactor was heated to 48° C., agitated at 800 RPM, pressurized with ethylene to 450 pounds and charged with 11.4 g of a 10% aqueous solution of SFS. The reaction was initiated by adding a solution of 14 g potassium persulfate and 4.7 g sodium acetate in 981.3 g deionized water at 0.6 ml/min. Upon initiation the rate of addition was switched to automatic and 984.7 g vinyl acetate added at 6.3 ml/min. and 185 g of a 30% aqueous solution of ABDA was added at 1.8 ml/min. One hour after initiation, a 10% aqueous solution of SFS was added at 0.2 ml/min. The reactor temperature was maintained at 49° C. and the pressure at 450 pounds. After three hours the vinyl acetate had been added and the ethylene was shut off. Thirty minutes later the ABDA had been added and the oxidant and reductant solutions were added for an additional thirty minutes. Thereupon, the reaction was cooled, degassed and treated with 5 g of a 10% aqueous solution of tBHP (70%) and 4.6 g of a 50% aqueous solution of Colloid 585 defoamer.

EXAMPLE 7

VAc/Et/ABDA (3%)   Trail

A 1 gallon reactor was charged, purged and heated and the reaction initiated as in Example 6. Upon initiation the rate of addition was switched to automatic and 984.7g vinyl acetate added at 6.3 ml/min. One hour after initiation a 10% aqueous solution of SFS was added at 0.2 ml/min. The reactor temperature was maintained at 49° C. and the pressure at 447 pounds. After 2¼ hours, 370 g of a 10% aqueous solution of ABDA was added at 3.5 ml/min. and at the three hour mark the vinyl acetate delay was finished and the ethylene shut off. The ABDA delay was complete at 4.0 hours whereupon the free monomer was 1.2%; the reaction was finished as in Example 6.

EXAMPLE 8

VAc/Et/ABDA (3%)   Short Trail

A 1 gallon reactor was charged with 1276.8 g deionized water, 1.5 g NATRDSOL 250HR hydroxyethyl cellulose, 36.8 g Igepal CD-887 surfactant, 8.6 g Igepal CO-630 surfactant, 11.4 g 10% aqueous SFS, 4.1 g sodium acetate and acetic acid to pH 4.64 and purged 30 minutes with nitrogen. The reactor was heated to 65° C., agitated at 900 RPM and pressurized to 500 pounds with ethylene. The reaction was initiated by adding 1323g of a solution comprised of 1654.5g vinyl acetate, 34.3 g Pluronic F-68 surfactant. 22.5 g Pluronic L-64 surfactant and 2.6 g tBHP (70%) at 9.9 ml/min. Ten minutes after initiation, a solution of 3.75 g SFS, 3.75 g sodium benzoate and 142.5 g deionized water was added at 0.3 ml/min. When the monomer delay was finished, an additional 328.8 g monomer solution mixed with 13.2 g ABDA was added at the same rate. Upon completion of this delay. 39.6 g of ABDA was added at 9.9 g ml/min. Three hours after starting the reductant solution, this delay was turned off and following a fifteen minute period 1.0 g tBHP in 3.0 g of deionized water was pumped into the reactor at 9.9 ml/min. If the ethylene pressure during polymerization ever dropped to 100 psi, the pressure was raised to 250 psi. The reaction was cooled, degassed, treated with 2.3 g Colloid 585 in 2.3 g deionized water and treated with ammonium hydroxide to pH of 7.5.

EXAMPLE 9

VAc/Et/ABDA (3%)   Long Trail

The procedure of Example 8 was essentially followed except that the 39.6 ABDA was added at 4.9 ml/min. If the ethylene pressure during polymerization ever dropped to 250 psi, it was maintained there. The reaction was finished substantially as in Example 8.

EXAMPLE 10

VAc/Et/ABDA   Trail

A 1 gallon reactor was charged with 700 g deionized water, 212.0 g Alipal CO-433 surfactant, 37.5 g sodium vinyl sulfonate (SVS), 1.0 g sodium acetate, 15.2 g reductant solution (17.2 g sodium meta-bisulfite, 15.75 g acetone and 397.5 g deionized water), 17.0 g glacial acetic acid, 0.1 g ferrous sulfate heptahydrate, 1387.9 g vinyl acetate, and purged twice with 30 psig of nitrogen at 150 rpm for five minutes each. The agitation was increased to 900 rpm and pressurization to 470 psig with ethylene was reached and brought to equilibrium. At 25° C. the reductant solution feed was started at 1.5 ml/min. and the catalyst solution (14.7 g 70% TBHP in 327.0 g deionized water) feed at 1.0 ml/min. Upon initiation, the temperature was ramped up to 50° C. over 30 minutes. When the vinyl acetate was 85% polymerized, 450 g of a 10% aqueous solution of ABDA was added to the reactor at 7.0 ml/min. When the ABDA delay was complete, the batch was cooled to 35° C. and transferred to the degasser. Following a venting of the ethylene, 8.0 ml of a 10% aqueous solution of sodium meta-bisulfite was added which in turn was followed by 20 ml of 7.2% TBHP over a 30 minute period.

EXAMPLE 11

VAc/Et/ABDA   Trail

A 1 gallon reactor was charged with 1142.7 g of a 2% aqueous solution of NATROSOL 250GR hydroxyethyl cellulose, 51.1 g vinyl acetate, 19.1 g Igepal C0887 surfactant, 13.3 g Igepal C0630 surfactant, 13.3 g Pluronic F-68 surfactant. 13.3 g Pluronic L-64 surfactant, 62.7 g deionized water, 5.5 g sodium acetate, 3.30 g acetic acid, 0.05 g ferric ammonium sulfate and 15.2 g of a reductant solution (19.8 g sodium meta-bisulfite, 11.6 g acetone and 408.0 g deionized water) and purged for 40 minutes with nitrogen. The reactor was heated to 48° C., agitated at 800 RPM, pressurized with ethylene to 450 lbs. and initiated by adding a 3% aqueous solution of TBHP at 0.6 ml/min. Upon initiation, the rate was switched to automatic and 1313 g vinyl acetate added at 8.4 ml/min. Ten minutes later the reductant solution was added at 0.2 ml/min. The reaction temperature was maintained at 49° C. and the free monomer at 8%. After two hours, 493 g of a 10% aqueous solution of ABDA was then 1.5%. The reaction was finished as in Example 6.

Table 1 presents information for the vinyl acetate copolymers of Examples 1-13 with respect to the crosslinkable monomer, its mode of addition, the percent of vinyl acetate monomer which had been added to the polymerization reaction medium at the time the crosslinkable monomer was first introduced to the reaction medium and the wet and perchloro tensiles of a nonwoven product bonded with the copolymer binder.

TABLE 1

| Example | Polymer Backbone | X-linkable Monomer % Monomer | X-linkable Monomer Addition Mode | % VAc Added at X-linkable Monomer Introduction | Wet Tensile | Perchloro Tensile |
| --- | --- | --- | --- | --- | --- | --- |
| 1 | PVOH/VAc | 5 ABDA | Continuous | 6.3 | 4.3 | 11.4 |
| 2 | PVOH/VAc | 5 ABDA | End | 93.8 | 5.8 | 13.8 |
| 3 | PVOH/VAc | 5 ABDA | Trail | 18.8 | 5.8 | |
| 4 | PVOH/VAc/Et | 5 ABDA | Continuous | 20.0 | 3.6 | 4.2 |
| 5 | PVOH/VAc/Et | 5 ABDA | Trail | 96.7 | 3.1 | 7.6 |
| 6 | VAc/Et | 3 ABDA | Continuous | 4.2 | 4.1 | 4.5 |
| 7 | VAc/Et | 3 ABDA | Trail | 86.9 | 6.3 | 6.6 |
| 8 | VAc/Et | 3 ABDA | Trail | 80.1 | 4.8 | |
| 9 | VAc/Et | 3 ABDA | Trail | 80.1 | 5.8 | |
| 10 | VAc/Et | 3 ABDA | Trail | 100 | 4.3 | |
| 11 | VAc/Et | 3 ABDA | Trail | 77.6 | 5.9 | |
| 12 | VAc/Et | 6 ABDA | Continuous | 4.2 | 6.3 | 8.1 |
| 13 | VAc/Et | 6 ABDA | Trail | 93.1 | 7.1 | 9.6 | was added at 4.0 ml/min. The vinyl acetate delay was complete at 3 hours and the ethylene turned off. The ABDA delay was complete at 4 hours whereupon the free monomer was then 1.5% so the reaction was cooled, degassed and treated with 5 g of a 10% aqueous solution of TBHP and 4.6 g of a 50% aqueous solution of Colloid 585 defoamer.

EXAMPLE 12

VAc/Et/ABDA (6%)  Continuous

A 1 gallon reactor was charged, purged and heated and the reaction initiated as in Example 6. Upon initiation the rate of addition was switched to auto (demand) and 984.7 g of vinyl acetate added at 6.3 ml/min. and 370 g of a 20% aqueous solution of ABDA added at 1.8 ml/min. One hour after the start of catalyst addition, a 10% aqueous solution of SFS was pumped in at 0.2 ml/min. The reactor temperature was maintained at 49° C. and the pressure at 460 lbs. After three hours, the vinyl acetate had been added and the ethylene shut off. Thirty minutes later the ABDA had been added and the oxidant and reductant solutions were added for an additional thirty minutes. Thereupon, the reaction was finished as in Example 6.

EXAMPLE 13

VAc/Et/ABDA (6%)  Trail

A 1 gallon reactor was charged, purged and heated and the reaction was initially essentially as in Example 6. Upon initiation the rate was switched to automatic and 984.7 g vinyl acetate added at 6.3 ml/min. One hour after the start of the oxidant addition, a 10% aqueous solution of SFS was pumped in at 0.2 ml/min. The reaction temperature was maintained at 49° C. (with a 5° delta) and the free monomer at 5%. After 2.25 hours, 370 g of a 20% aqueous solution of ABDA was added at 3.5 ml/min. The vinyl acetate delay was complete at 3.0 hours and the ethylene turned off. The ABDA delay was complete at 4.0 hours whereupon the free monomer

EXAMPLE 14

This example shows that other conventional crosslinkable monomers used in preparing vinyl acetate and vinyl acetate/ethylene emulsion copolymer binders do not respond to trail addition with regard to binder properties as occurs with crosslinkable monomers of formula I. In this example Runs 1-7 were performed substantially following the comparable procedures for the addition mode in Examples 1-13 except that the crosslinkable monomer used was N-isobutoxymethyl acrylamide (IBMA), N-methylol acrylamide (NMA) and arylamidoglycolic aid (AGA).

TABLE 2

| Run | Polymer Backbone | % Monomer | Addition Mode | Wet Tensile | Perchloro Tensile |
| --- | --- | --- | --- | --- | --- |
| 1 | VAc/Et | 5 IBMA | Continuous | 5.0 | 4.6 |
| 2 | VAc/Et | 5 IBMA | End | 4.2 | 5.0 |
| 3 | VAc/Et | 5 IBMA | Trail | 4.4 | 5.3 |
| 4 | VAc/Et | 5 NMA | Continuous | 6.2 | 5.6 |
| 5 | VAc/Et | 5 NMA | End | 2.6 | 3.9 |
| 6 | VAc/Et | 3 AGA | Continuous | 5.7 | 4.3 |
| 7 | VAc/Et | 3 AGA | Trail | 3.7 | 4.1 |

It can be seen from the data in Table 2 that the trail addition of IBMA and AGA into their respective polymerization recipes while affording comparable or slightly improved perchloro tensiles yielded significantly reduced wet tensiles compared to the well known continuous addition of the crosslinkable monomer.

EXAMPLES 15-18

In these Examples vinyl acetate polymers contaiing copolymerized monomers of formula I and prepared using the "trail" method of the invention were applied as binder emulsions on Whatman paper at 10% binder solids add-on. Ammonium chloride was added as a curing catalyst as 1% solids and the impregnated paper was dried and cured at 150° C. for 3 minutes. Table 3 shows the tensile strength values for the bonded paper.

TABLE 3

| Example | BASIC Polymer | Crosslinker Monomer | Addition Mode X-Linker Monomer | TENSILE VALUES (pli) Dry | Wet | Perchloro | MEK |
|---|---|---|---|---|---|---|---|
| Paper without binder | — | — | | 8.2 | 0.2 | 6.0 | — |
| | VAc/Et | 0% | | 12.5 | 1.0 | 3.5 | — |
| 15 | VAc | 10% DBMA | Trail | 14.3 | 2.2 | 7.1 | 2.6 |
| 16 | VAc | 3% DEBMU | Trail | 17.3 | 5.0 | 6.4 | 4.2 |
| 17 | VAc | 3% DEEMU | Trail | 17.3 | 6.3 | 7.1 | 4.1 |
| 18 | VAc/BA | 5% ABDA | Trail | 18.2 | 7.1 | 6.3 | 4.9 |

BA butyl acrylate (13%)
DBMA diethoxybutylmaleamic acid
DEBMU N—(diethoxybutyl)-N'—acryloxyethyl urea
DEEMU N—(diethoxyethyl)-N'—acryloxyethyl urea

STATEMENT OF INDUSTRIAL APPLICATION

The performance properties of crosslinkable vinyl acetate and vinyl acetate/ethylene emulsion copolymers as nonwoven binders is improved through the "trail" addition of ABDA-type comonomers to the polymerization reaction mixture.

We claim:

1. In a process for preparing a nonwoven binder emulsion containing a crosslinkable vinyl acetate copolymer prepared by polymerizing vinyl acetate in an aqueous dispersion with a crosslinkable comonomer of formula I $$R-NH-(CH_2)_n-CH(OR^1)_2 \qquad I$$

wherein R is a $C_3-C_{10}$ olefinically unsaturated organic radical having functionality which renders the nitrogen atom electron deficient, the olefinic unsaturation functionality being polymerizable, $R^1$ is hydrogen or a $C_1-C_4$ alkyl group and n is 3 or 4, the improvement which comprises (1) polymerizing vinyl acetate in an aqueous dispersion reaction mixture,
(2) commencing the addition of 0.5 to 15 wt % of a crosslinkable comonomer of formula I to the reaction mixture when about 50 to 80% of the vinyl acetate in the polymerization recipe has been polymerized, and
(3) completing addition of the crosslinkable comonomer after the completion of the addition of the vinyl acetate to the reaction mixture and substantially with the finishing of vinyl acetate polymerization.

2. The process of claim 1 in which the polymerization reaction is performed under an ethylene pressure sufficient to yield a crosslinkable vinyl acetate copolymer which is 3-30 wt % ethylene.

3. The process of claim 2 in which the crosslinkable vinyl acetate copolymer is 8-20 wt % ethylene.

4. The process of claim 1 in which the addition of the crosslinkable comonomer is commenced when about 65-75% of the vinyl acetate has been polymerized.

5. The process of claim 1 in which 2-6 wt % of the crosslinkable comonomer is added.

6. The process of claim 1 in which the addition of the crosslinkable comonomer is completed when the free vinyl acetate content of the reaction mixture is from 0.5-4 wt %.

7. The process of claim 6 in which the addition of the crosslinkable comonomer is completed when the free vinyl acetate content of the reaction mixture is from 1-2 wt %.

8. The process of claim 1 in which R is an alpha,beta-unsaturated $C_3-C_5$ alkenoyl group and $R^1$ is methyl or ethyl.

9. The process of claim 8 in which R is a (meth)acryloyl.

10. A process for preparing a nonwoven binder emulsion comprising
(1) polymerizing vinyl acetate in an aqueous dispersion reaction mixture,
(2) commencing the addition 0.5 to 15 wt % of a crosslinkable comonomer of formula I $$R-NH-(CH_2)_n-CH(OR^1)_2 \qquad I$$

wherein R is a (meth)acryloyl, $R^1$ is hydrogen or a $C_1-C_4$ alkyl group and n is 3 or 4, to the reaction mixture when about 50-80% of the total vinyl acetate in the polymerization recipe has been polymerized,
(3) completing addition of the crosslinkable comonomer after the completion of the addition of vinyl acetate to the reaction mixture and when the free vinyl acetate content of the reaction medium is from 0.5 to 4%.

11. The process of claim 10 in which the polymerization is performed under an ethylene pressure sufficient to provide a crosslinkable vinyl acetate copolymer which is 8-20 wt % ethylene.

12. The process of claim 11 in which the addition of the crosslinkable comonomer is commenced when 65-75% of the vinyl acetate has been polymerized.

13. The process of claim 12 in which 2-6 wt % of a crosslinkable comonomer is added.

14. The process of claim 13 in which the addition of the crosslinkable comonomer is completed when the free vinyl acetate content is from 1-2%.

15. The process of claim 14 in which the crosslinkable comonomer is acrylamidobutyraldehyde diethyl or dimethyl acetal.

16. A nonwoven binder emulsion prepared according to the process of claim 1.

17. The nonwoven binder emulsion prepared according to the process of claim 2.

18. The nonwoven binder emulsion prepared according to the process of claim 10.

19. The nonwoven binder emulsion prepared according to the process of claim 11.

20. The nonwoven binder emulsion prepared according to the process of claim 15.

21. A nonwoven product comprising a nonwoven web of fibers bonded together with a binder deposited from the binder emulsion of claim 1 at a binder add-on which is sufficient to bind the fibers together to form a self-sustaining web.

22. A nonwoven product comprising a nonwoven web of fibers bonded together with a binder deposited from the binder emulsion of claim 2 at a binder add-on which is sufficient to bind the fibers together to form a self-sustaining web.

23. A nonwoven product comprising a nonwoven web of fibers bonded together with a binder deposited from the binder emulsion of claim 10 at a binder add-on which is sufficient to bind the fibers together to form a self-sustaining web.

24. A nonwoven product comprising a nonwoven web of fibers bonded together with a binder deposited from the binder emulsion of claim 11 at a binder add-on which is sufficient to bind the fibers together to form a self-sustaining web.

25. A nonwoven product comprising a nonwoven web of fibers bonded together with a binder deposited from the binder emuision of claim 15 at a binder add-on which is sufficient to bind the fibers together to form a self-sustaining web.

* * * * *